(12) United States Patent
Bitincka et al.

(10) Patent No.: US 11,604,779 B1
(45) Date of Patent: *Mar. 14, 2023

(54) QUERY ACCELERATION USING INTERMEDIATE SUMMARIES

(71) Applicant: Splunk Inc., San Francisco, CA (US)

(72) Inventors: Ledion Bitincka, San Francisco, CA (US); Stephen Phillip Sorkin, San Francisco, CA (US); Steve Yu Zhang, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,444

(22) Filed: May 10, 2021

Related U.S. Application Data

(63) Continuation of application No. 16/920,187, filed on Jul. 2, 2020, now Pat. No. 11,030,173, which is a continuation of application No. 16/155,746, filed on Oct. 9, 2018, now Pat. No. 10,719,493, which is a continuation of application No. 14/530,678, filed on
(Continued)

(51) Int. Cl.
| | |
|---|---|
| *G06F 16/22* | (2019.01) |
| *G06F 16/245* | (2019.01) |
| *G06F 16/248* | (2019.01) |
| *G06F 16/27* | (2019.01) |
| *G06F 16/901* | (2019.01) |

(52) U.S. Cl.
CPC ........ *G06F 16/2228* (2019.01); *G06F 16/245* (2019.01); *G06F 16/248* (2019.01); *G06F 16/278* (2019.01); *G06F 16/901* (2019.01)

(58) Field of Classification Search
None
See application file for complete search history.

(56) References Cited

U.S. PATENT DOCUMENTS

| 7,171,406 B2 * | 1/2007 | Chen ..................... G06Q 10/10 |
| 7,233,947 B2 * | 6/2007 | Lomet ................ G06F 16/2477 |
| | | 707/703 |

(Continued)

OTHER PUBLICATIONS

Bitincka, Ledion, et al., "Optimizing Data Analysis With a Semi-Structured Time Series Database", Usenix SLAML '10, Oct. 10, 2010, pp. 1-9. (Year: 2010).*

(Continued)

*Primary Examiner* — Scott A. Waldron
(74) *Attorney, Agent, or Firm* — Artegis Law Group, LLP

(57) ABSTRACT

A method and system for managing searches of a data set that is partitioned based on a plurality of events. A structure of a search query may be analyzed to determine if logical computational actions performed on the data set is reducible. Data in each partition is analyzed to determine if at least a portion of the data in the partition is reducible. In response to a subsequent or reoccurring search request, intermediate summaries of reducible data and reducible search computations may be aggregated for each partition. Next, a search result may be generated based on at least one of the aggregated intermediate summaries, the aggregated reducible search computations, and a query of adhoc non-reducible data arranged in at least one of the plurality of partitions for the data set.

27 Claims, 11 Drawing Sheets

Related U.S. Application Data

Oct. 31, 2014, now Pat. No. 10,255,310, which is a continuation of application No. 14/168,738, filed on Jan. 30, 2014, now Pat. No. 9,177,002, which is a continuation of application No. 13/664,239, filed on Oct. 30, 2012, now Pat. No. 8,682,886.

(60) Provisional application No. 61/649,125, filed on May 18, 2012.

(56) References Cited

U.S. PATENT DOCUMENTS

| | | | | |
|---|---|---|---|---|
| 7,937,344 B2* | 5/2011 | Baum | | G06F 9/542 |
| | | | | 706/20 |
| 7,958,083 B2* | 6/2011 | Vermette | | G06F 16/00 |
| | | | | 707/602 |
| 8,112,425 B2* | 2/2012 | Baum | | G06F 16/24575 |
| | | | | 707/746 |
| 8,280,847 B2* | 10/2012 | Hao | | G06F 16/25 |
| | | | | 707/610 |
| 8,301,603 B2* | 10/2012 | Kan | | G06F 16/31 |
| | | | | 707/711 |
| 8,682,886 B2* | 3/2014 | Sorkin | | G06F 16/278 |
| | | | | 707/715 |
| 8,751,529 B2* | 6/2014 | Zhang | | G06F 16/2471 |
| | | | | 707/795 |
| 8,788,525 B2* | 7/2014 | Neels | | G06F 16/245 |
| | | | | 707/765 |
| 9,177,002 B2* | 11/2015 | Sorkin | | G06F 16/245 |
| 9,215,240 B2* | 12/2015 | Merza | | H04L 63/1416 |
| 9,286,413 B1* | 3/2016 | Coates | | G06F 16/26 |
| 10,127,258 B2* | 11/2018 | Lamas | | G06F 16/2291 |
| 2010/0169304 A1* | 7/2010 | Hendricksen | | G06F 16/319 |
| | | | | 707/723 |
| 2014/0149423 A1* | 5/2014 | Sorkin | | G06F 16/901 |
| | | | | 707/741 |
| 2015/0058353 A1* | 2/2015 | Sorkin | | G06F 16/278 |
| | | | | 707/771 |
| 2019/0098106 A1* | 3/2019 | Mungel | | H04L 67/02 |

OTHER PUBLICATIONS

"Community: Summary Indexing", Splunk Wiki, page last modified Mar. 20, 2011, 3 pages. (Year: 2011).*

* cited by examiner

| Time | Name | Size | Server |
|---|---|---|---|
| 2012-10-15T00:00:05.701+0000 | typingqueue | 500 | ip-10-148-147-75-root |
| 2012-10-15T00:00:05.701+0000 | tcpin_queue | 500 | ip-10-148-147-75-root |
| 2012-10-15T00:00:05.701+0000 | stashparsing | 500 | ip-10-148-147-75-root |
| 2012-10-15T00:00:05.701+0000 | splunktcpin | 500 | ip-10-148-147-75-root |
| 2012-10-15T00:00:05.701+0000 | parsingqueue | 6144 | ip-10-148-147-75-root |
| 2012-10-15T00:00:05.701+0000 | nullqueue | 500 | ip-10-148-147-75-root |
| 2012-10-15T00:00:05.701+0000 | indexqueue | 500 | ip-10-148-147-75-root |
| 2012-10-15T00:00:05.701+0000 | fschangemanager_queue | 5120 | ip-10-148-147-75-root |
| 2012-10-15T00:00:05.701+0000 | auditqueue | 500 | ip-10-148-147-75-root |
| 2012-10-15T00:00:05.701+0000 | aggqueue | 1024 | ip-10-148-147-75-root |
| 2012-10-15T00:00:05.701+0000 | aq | 10240 | ip-10-148-147-75-root |
| 2012-10-15T00:00:05.701+0000 | aeq | 500 | ip-10-148-147-75-root |
| 2012-10-15T00:00:08.101+0000 | fschangemanager_queue | 5120 | ip-10-148-133-134-root |
| 2012-10-15T00:00:08.101+0000 | auditqueue | 500 | ip-10-148-133-134-root |
| 2012-10-15T00:00:08.101+0000 | aq | 10240 | ip-10-148-133-134-root |
| 2012-10-15T00:00:08.101+0000 | aeq | 500 | ip-10-148-133-134-root |
| 2012-10-15T00:00:08.101+0000 | tcpout_indexers | | ip-10-148-133-134-root |
| 2012-10-15T00:00:08.101+0000 | fschangemanager_queue | 5120 | ip-10-148-144-147-root |
| 2012-10-15T00:00:08.101+0000 | auditqueue | 500 | ip-10-148-144-147-root |

Fig. 9

| time | name | count(size) | Maximum(size) | Sum(size) |
|---|---|---|---|---|
| 2012-10-15T00:00:05.000+0000 | aeq | 4 | 500 | 2000 |
| 2012-10-15T00:00:05.000+0000 | aggqueue | 2 | 1024 | 2048 |
| 2012-10-15T00:00:05.000+0000 | aq | 4 | 10240 | 40960 |
| 2012-10-15T00:00:05.000+0000 | auditqueue | 4 | 500 | 2000 |
| 2012-10-15T00:00:05.000+0000 | fschangemanager_queue | 4 | 5120 | 20480 |
| 2012-10-15T00:00:05.000+0000 | indexqueue | 4 | 500 | 2000 |
| 2012-10-15T00:00:05.000+0000 | nullqueue | 4 | 500 | 2000 |
| 2012-10-15T00:00:05.000+0000 | parsingqueue | 4 | 6144 | 13312 |
| 2012-10-15T00:00:05.000+0000 | splunktcpin | 2 | 500 | 1000 |
| 2012-10-15T00:00:05.000+0000 | stashparsing | 4 | 500 | 2000 |
| 2012-10-15T00:00:05.000+0000 | tcpin_queue | 2 | 500 | 1000 |
| 2012-10-15T00:00:05.000+0000 | tcpout_indexers | | | |
| 2012-10-15T00:00:05.000+0000 | typingqueue | 2 | 500 | 1000 |
| 2012-10-15T00:00:10.000+0000 | aeq | 4 | 500 | 2000 |
| 2012-10-15T00:00:10.000+0000 | aggqueue | 1 | 1024 | 1024 |
| 2012-10-15T00:00:10.000+0000 | aq | 4 | 10240 | 40960 |
| 2012-10-15T00:00:10.000+0000 | auditqueue | 4 | 500 | 2000 |
| 2012-10-15T00:00:10.000+0000 | fschangemanager_queue | 4 | 5120 | 20480 |
| 2012-10-15T00:00:10.000+0000 | indexqueue | 4 | 500 | 2000 |
| 2012-10-15T00:00:10.000+0000 | nullqueue | 4 | 500 | 2000 |
| 2012-10-15T00:00:10.000+0000 | parsingqueue | 4 | 6144 | 7680 |
| 2012-10-15T00:00:10.000+0000 | splunktcpin | 1 | 500 | 500 |
| 2012-10-15T00:00:10.000+0000 | stashparsing | 4 | 500 | 2000 |
| 2012-10-15T00:00:10.000+0000 | tcpin_queue | 1 | 500 | 500 |
| 2012-10-15T00:00:10.000+0000 | tcpout_indexers | | | |
| 2012-10-15T00:00:15.000+0000 | typingqueue | 1 | 500 | 500 |
| 2012-10-15T00:00:15.000+0000 | aeq | 1 | 500 | 500 |
| 2012-10-15T00:00:15.000+0000 | aggqueue | 1 | 1024 | 1024 |
| 2012-10-15T00:00:15.000+0000 | aq | 1 | 10240 | 10240 |

Fig. 10

QUERY ACCELERATION USING INTERMEDIATE SUMMARIES

CROSS-REFERENCE TO RELATED APPLICATION

This application claims benefit under 35 U.S.C. § 120 as a Continuation of U.S. application Ser. No. 16/920,187, filed Jul. 2, 2020, which claims benefit as a Continuation of U.S. application Ser. No. 16/155,746, filed Oct. 9, 2018, which claims benefit as a Continuation of U.S. application Ser. No. 14/530,678, filed Oct. 31, 2014, now issued as U.S. Pat. No. 10,255,310, which claims benefit as a Continuation of U.S. application Ser. No. 14/168,738, filed on Jan. 30, 2014, now issued as U.S. Pat. No. 9,177,002, which claims benefit as a Continuation of U.S. application Ser. No. 13/664,239, filed on Oct. 30, 2012, now issued as U.S. Pat. No. 8,682,886, which claims the benefit of U.S. Provisional Application 61/649,125 filed on May 18, 2012. The entire contents of each of the above-listed applications is hereby incorporated by reference for all purposes as if fully set forth herein.

TECHNICAL FIELD

The invention is directed to providing services for use by a customer, and more particularly, to providing search services to the customer over a network.

BACKGROUND OF THE INVENTION

Many companies install and maintain search software for use on a variety of distributed systems that can range from a single computer for a small business to a collection of servers and a plurality of user computer nodes for a large corporation. In the past, search reports based on relatively large sets of indexed data were time consuming to generate. To reduce latency in search report generation for a larger data set, intermediate summaries for reoccurring search reports for partitioned data have been periodically generated and stored in a separate index. Subsequently, a search report run on the data set would aggregate the corresponding pre-computed intermediate summaries to generate the search report in a relatively shorter period of time. However, the nature of different types of data and the structure of different search queries has made it difficult to manage and configure these intermediate summaries. For example, some partitions may include data that is highly reducible for a search query and other partitions may include data that is only marginally reducible for the same search query. Also, for a single set of data in a partition, it may be reducible for some queries but not others. Other difficulties include configuring the amount of data included in the partitions of the data set, such as adding newly identified data to a partition after intermediate summaries are generated. Consequently, systems that can manage search report generation for relatively large sets of data are the subject of considerable innovation.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein:

FIG. 9 shows an exemplary table of raw data; and

FIG. 10 illustrates an exemplary table of intermediate summaries in accordance with the various embodiments.

DESCRIPTION OF THE VARIOUS EMBODIMENTS

Figure 1:
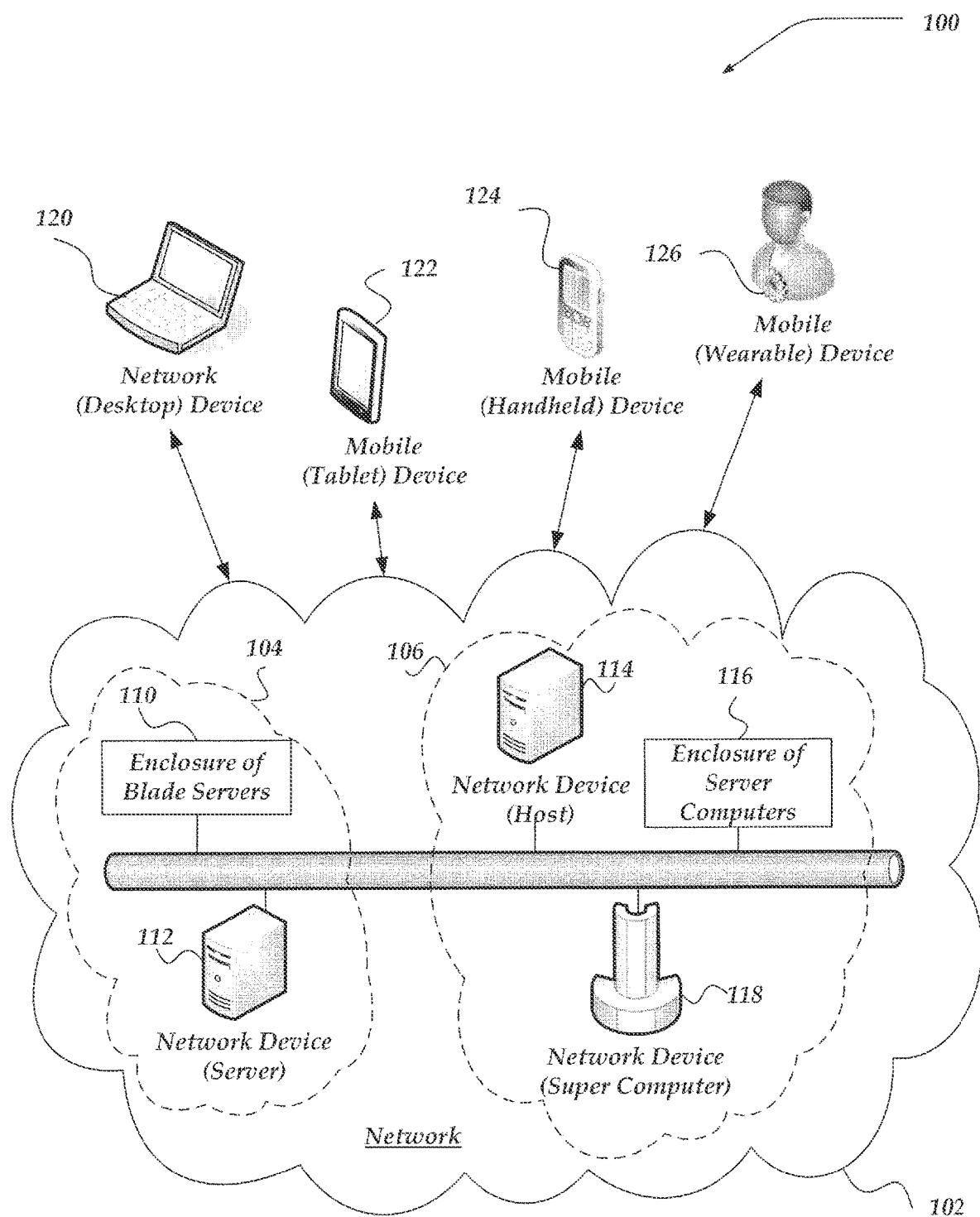
FIG. 1 illustrates a system environment in which various embodiments may be implemented.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein;

rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

For example embodiments, the following terms are also used herein according to the corresponding meaning, unless the context clearly dictates otherwise.

The term "query" as used herein refers to commands and/or sequences of commands that are directed for searching and/or retrieving data from a record datastore. Queries generally produce a result or results based on the form and structure of the particular query. Query results may be sorted and grouped based on the structure and form of the query. In at least one of the various embodiments, queries may includes operators and functions for calculating value based on the stored records, including functions that produce results sets that may include statistics and metrics about the portions of the record datastore. Structure Query Language (SQL) is a well-know query language often used to form queries for relational databases; herein queries may be described using a "SQL-like' form for readability. However, the various embodiments are not limited to using SQL-like formatting for queries and other well know query languages and/or custom query languages may be employed consistent with what is claimed herein.

"Index", "Indexer", "Indexing", and "Index Storage" as used herein may represent elements of described embodiments that may index and store data and events. Indexers may collect, parse, and store data to facilitate fast and accurate information retrieval. Index design may incorporate interdisciplinary concepts from linguistics, cognitive psychology, mathematics, informatics, physics, and computer science. Also, Indexes may reside in flat files in a data store on a file system which may be distributed and enables distributed computations. Index files may be managed to facilitate flexible searching and fast data retrieval, eventually archiving them according to a configurable schedule. During indexing, incoming raw data may be processed to enable fast search and analysis, the results of which may be stored in an index. As part of the indexing process, the indexer may add knowledge to the data in various ways, including by: separating a data stream into individual, searchable events; creating or identifying timestamps; extracting fields such as host, source, and source type; performing user-defined actions on the incoming data, such as identifying custom fields, masking sensitive data, writing new or modified keys, applying breaking rules for multi-line events, filtering unwanted events, routing events to specified indexes or servers, and the like. Also, for a reducible structure of a reoccurring search, the indexer can perform a logical sequence of actions on the data, e.g., computing averages, variances, root mean squares, or the like.

Briefly stated, various embodiments are directed towards a system and method for managing and configuring one or more different search reports for a data set that is partitioned based on a time of occurrence for a plurality of events. Data corresponding to each event may be arranged in a corresponding partition. In at least one of the various embodiments, a structure of a search query for a particular search report may be analyzed to determine if at least a portion of the query's logical computational actions are reducible. If so, the reducible search computations are performed on at least one of the partitions. Also, in at least one of the various embodiments, data in each partition is analyzed to determine if at least a portion of the data is reducible for a particular search report. If so, intermediate summaries are generated for the reducible data which may be arranged in one or more partitions. In response to a subsequent or reoccurring request for a particular search report, the corresponding intermediate summaries and reducible search computations may be aggregated for each partition. Next, a search result may be generated based on at least one of the aggregated intermediate summaries, the aggregated reducible search computations, and a search query of any remaining adhoc non-reducible data arranged in at least one of the plurality of partitions for the data set. Additionally, intermediate summaries and reducible search computations may be reused for more than one particular search report.

In at least one of the various embodiments, each partition of the data set is based on at least a time for an event. Also, in at least one of the various embodiments, the data may include time series data where each data record has a timestamp associated with it. Search reports for the stored time series data may be limited by a range of time (such as between one time and another, or data earlier than a given time, and the like) and/or provide search results ordered by a time (such as from earliest-to-latest or vice versa). Additionally, in at least one of the various embodiments, newly identified other data related to an event may be appended to a particular partition that corresponds to the event.

In at least one of the various embodiments, at least a portion of at least one partition of the data set can include adhoc data that is substantially unique/non-reducible for a particular search report. For example, in at least one of the various embodiments, if the amount of adhoc non-reducible data in a partition for a particular search report is substantially greater than reducible data, the process may stop generating further intermediate summaries for that partition for that particular search report unless more reducible data is appended to the partition. In at least one of the various embodiments, reoccurrences of the search report may be one of periodic, intermittent, or random.

In at least one of the various embodiments, a logical sequence of actions performed by a reducible search computation for a particular search report may be normalized for the partitioned data set. Additionally, in at least one of the various embodiments, a uniqueness value for at least a portion of the data in each partition for a particular search report may be determined. Also, a high uniqueness value may be employed to identify the non-reducible data and a low uniqueness value may be employed to identify reducible data in each partition for a particular search report. Additionally, the data may be stored in one or more data stores, and one or more computing devices may be employed to distribute the computing of intermediate summaries, reducible search computations, and search results for a plurality of different search reports.

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Additionally, it should be appreciated that though many embodiments described herein may be cloud-based, embodiments should not be considered so limited. One of ordinary skill in the art will recognize that enabling embodiments may be arranged to be partially deployed in cloud-based configurations with some elements in the cloud and some elements separate from cloud based resources. Likewise, enabling embodiments may be arranged to be deployed and operate in configurations entirely separate from cloud-based resources.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include server network device 112, host network device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
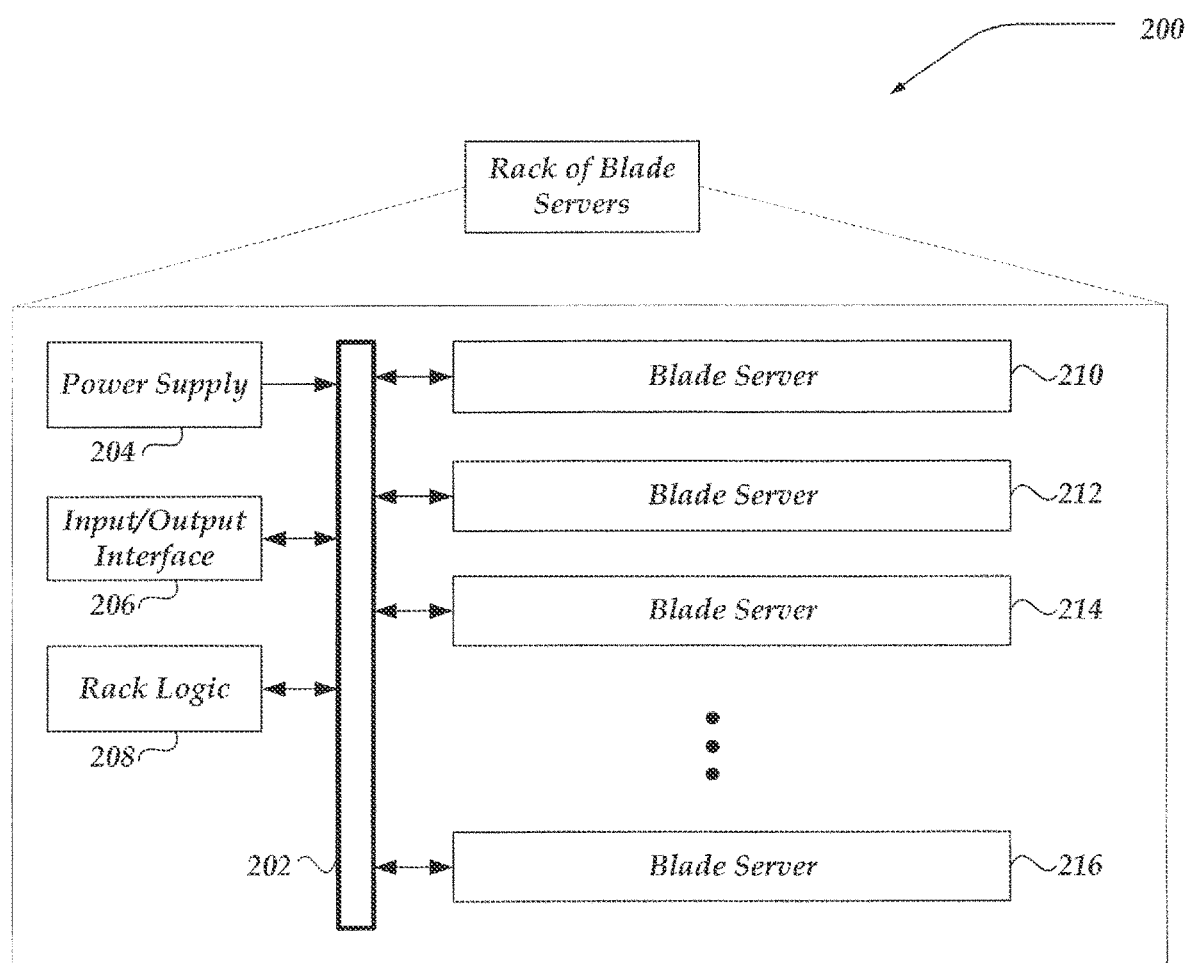
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
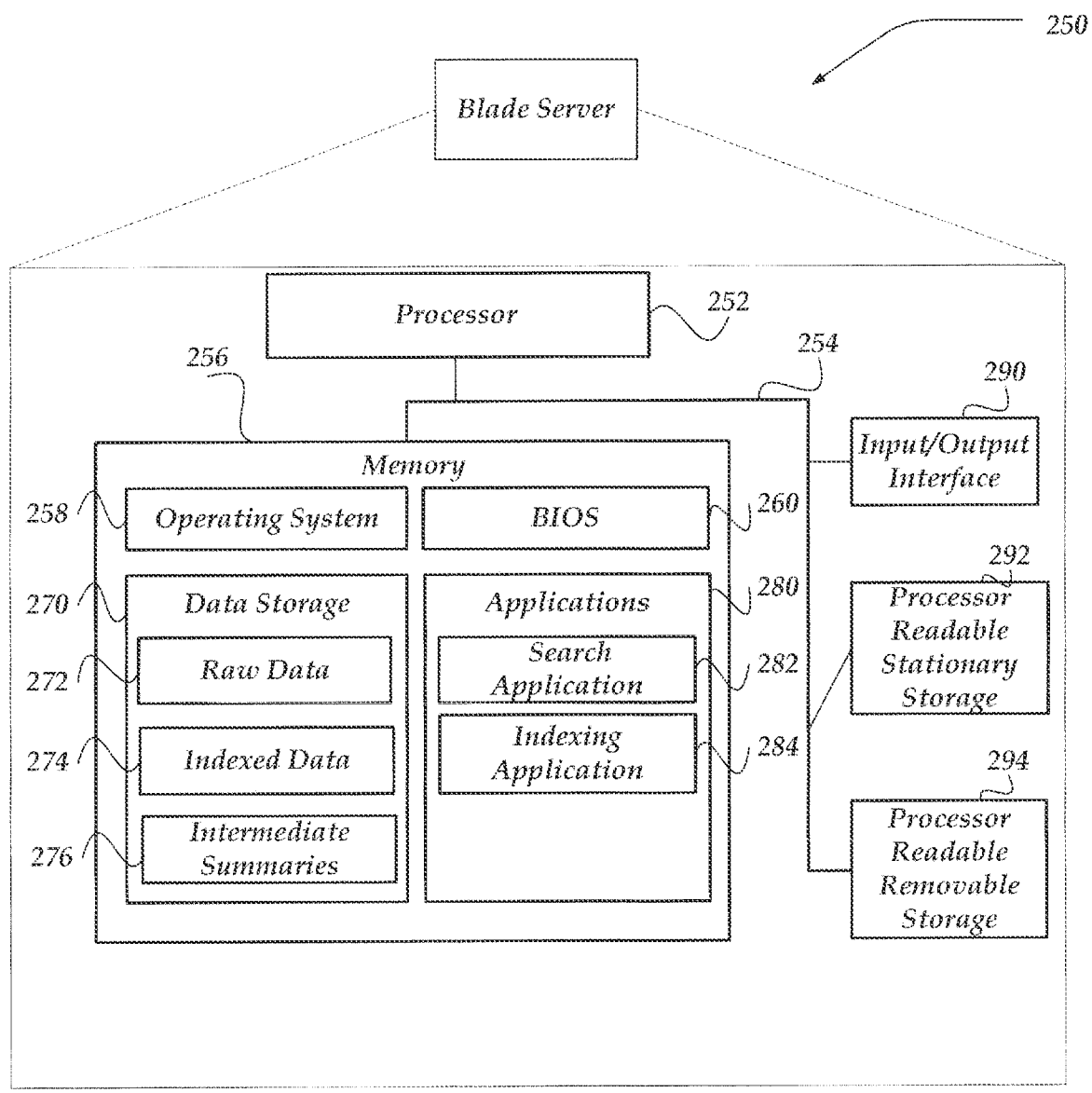
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 190 may provide wireless and/or wired communication links for blade server. Processor-readable stationary storage device 292 may include devices such as an electromagnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUX™, or a specialized server operating system such as Microsoft's Windows Server™ and Apple Computer's IoS Server™.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, raw data 272, indexed data 274, and intermediate summaries 276.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, search application 282, and indexing application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
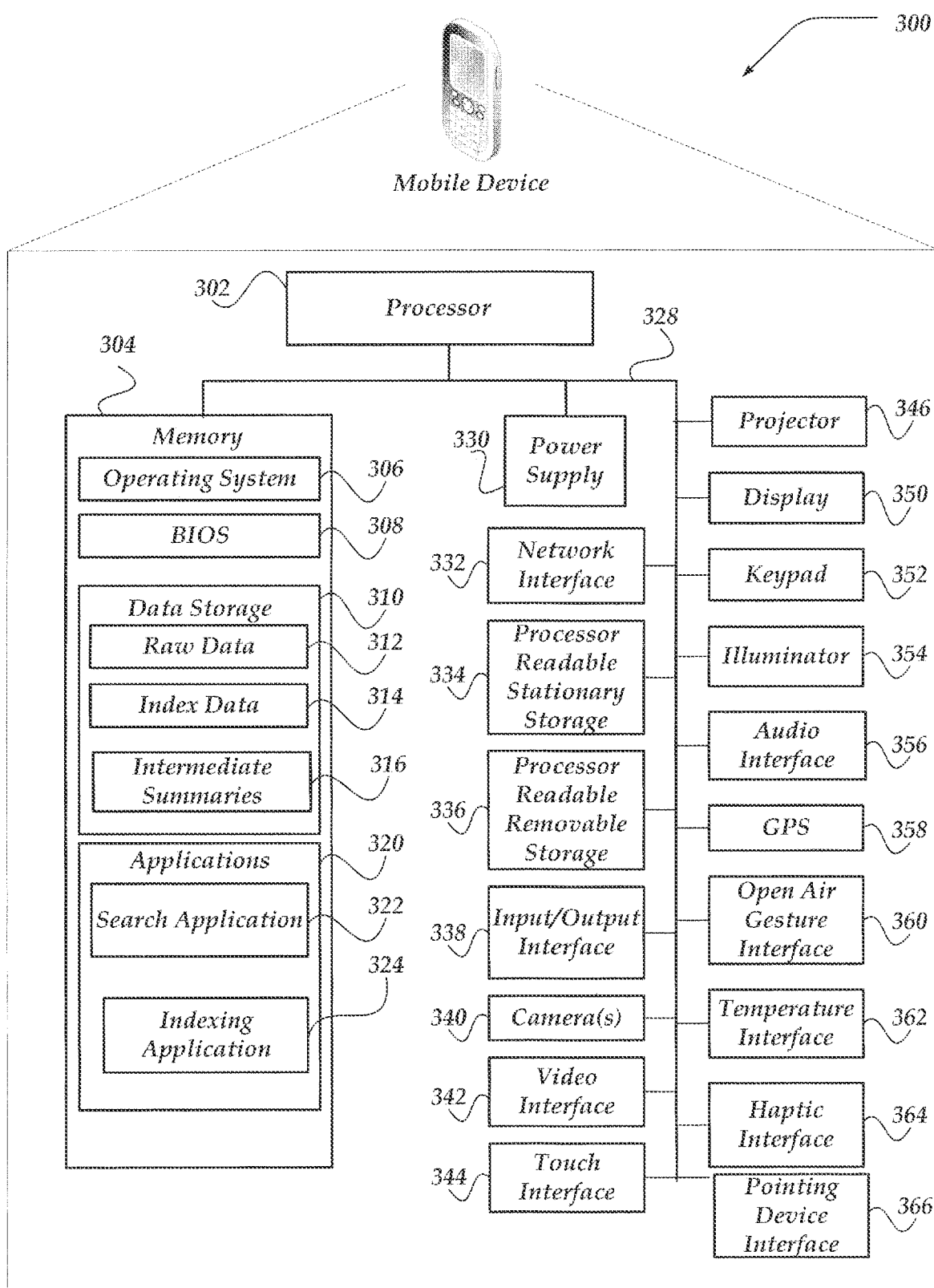
FIG. 3 shows a schematic embodiment of a mobile device.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS), Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300. It will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, raw data 312, index data 314 and intermediate summaries 316.

Applications 320 may include computer executable instructions which, when executed by mobile device 300, transmit, receive, and/or otherwise process instructions and data. Applications 320 may include, for example, Search application 322, and Indexing Application 324. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
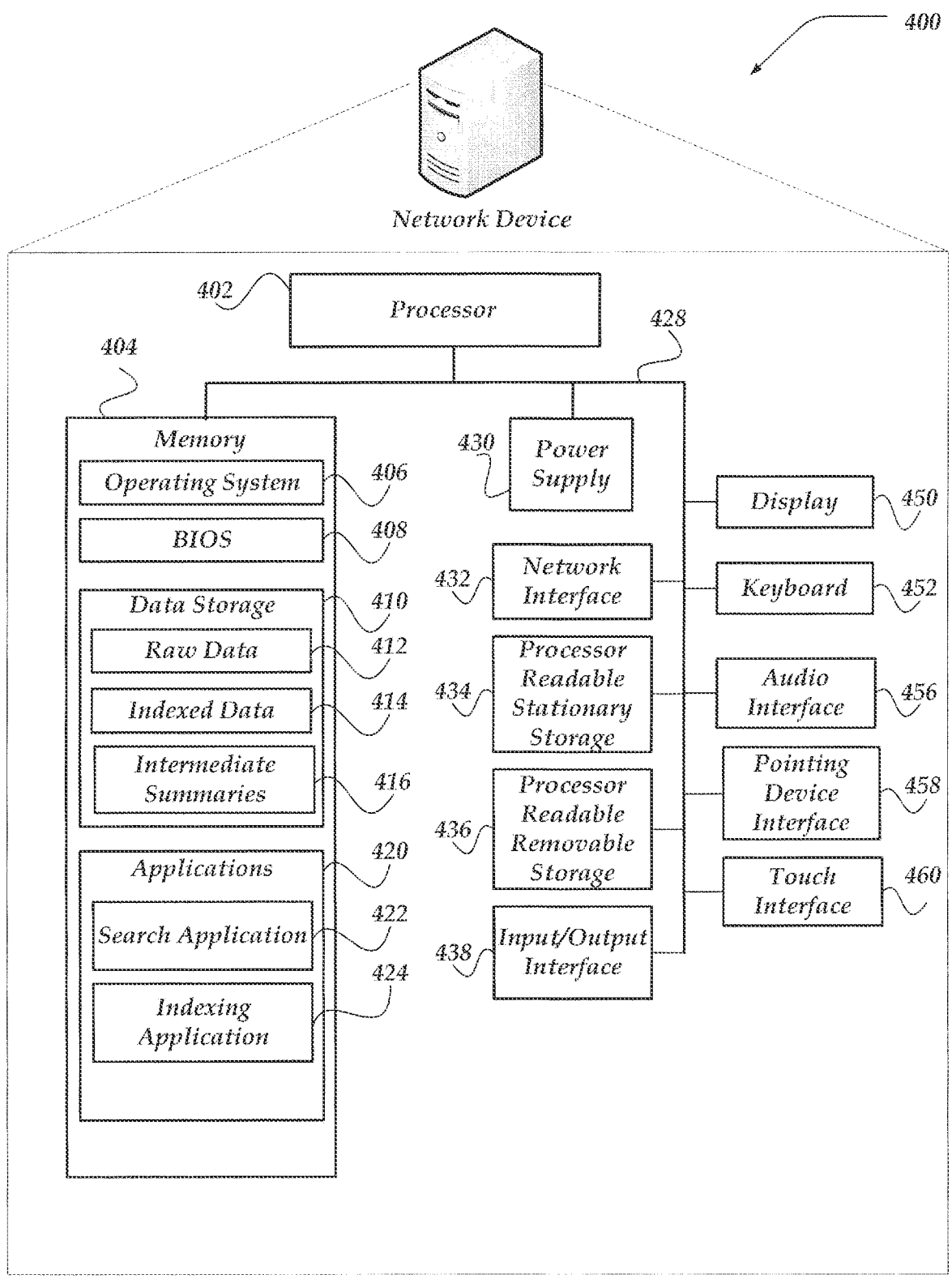
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, raw data 412, indexed data 414, and intermediate summaries 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, search application 422, and indexing application 424.

General Operation

Figure 5:
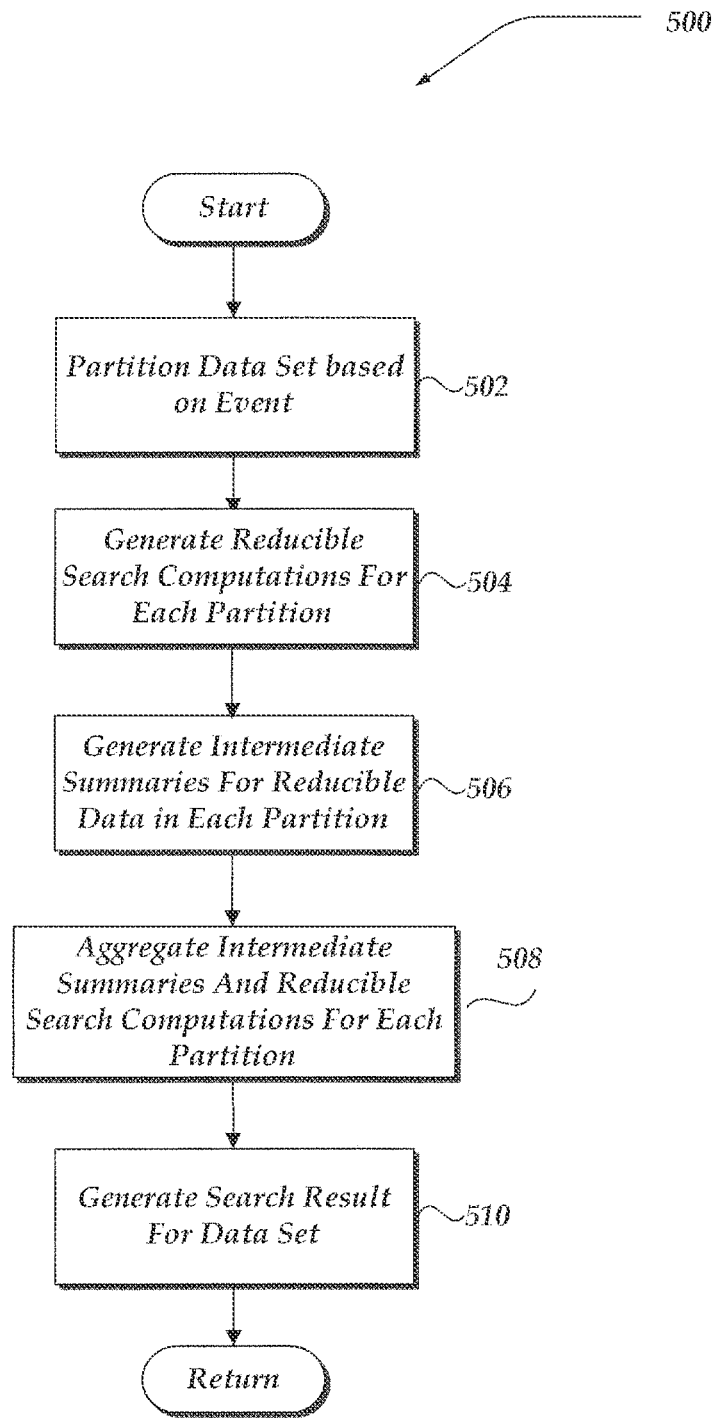
FIG. 5 shows a flowchart for general processing a data set and provide a result in response to a search query.

FIG. 5, illustrates a flowchart for general overview 500 of at least one of the various embodiments for processing a search query for a particular search report. Moving from a start block, the process steps to block 502 where a data set is arranged in a plurality of partitions based at least in part on separate events over time.

Stepping to block 504, reducible search computations for the particular search report are performed for data in at least one of the partitions. A search computation is a logical sequence of actions performed on data to generate a result. A reducible search computation might generate an average, a variance, a root mean square, or the like that can potentially be reused in one or more different search reports. In contrast, a non-reducible search computation might instead require accessing most if not all of the data in each partition each time a particular search report is requested. For example, the non-reducible search computation might involve computing a statistic that is grouped by the value of a high cardinality field, such as a user ID or an IP address. Since this type of computation is unlikely to be significantly reducible, the intermediate summaries would be on par with the size of the original data. In this case, the process would skip generating the intermediate summaries for this partition of the data or that particular search report. In at least one of the various embodiments, at least some of the reducible search computations may be generated by an application that also enables indexing of the data into one or more partitions that correspond to events over time.

Advancing to block 506, one or more intermediate summaries are generated for reducible data for the particular search report in each partition. Also, depending on the nature of the data in each partition, a partition may include one or more intermediate summaries, adhoc data, or a combination of both intermediate summaries and adhoc data. In at least one of the various embodiments, at least some of the intermediate summaries are generated by an application that also enables indexing of the data into one or more partitions that correspond to events over time.

At block 508, in response to a search query for a particular search report, the intermediate summaries and the reducible search computations that correspond to the search report are aggregated for the data set.

Then, at block 510, a search result is generated for the particular search report based at least one of the aggregated intermediate summaries, aggregated reducible search computations, and the processing of any remaining adhoc data in one or more partitions with the search query. Next, the process returns to performing other actions.

Figure 6:
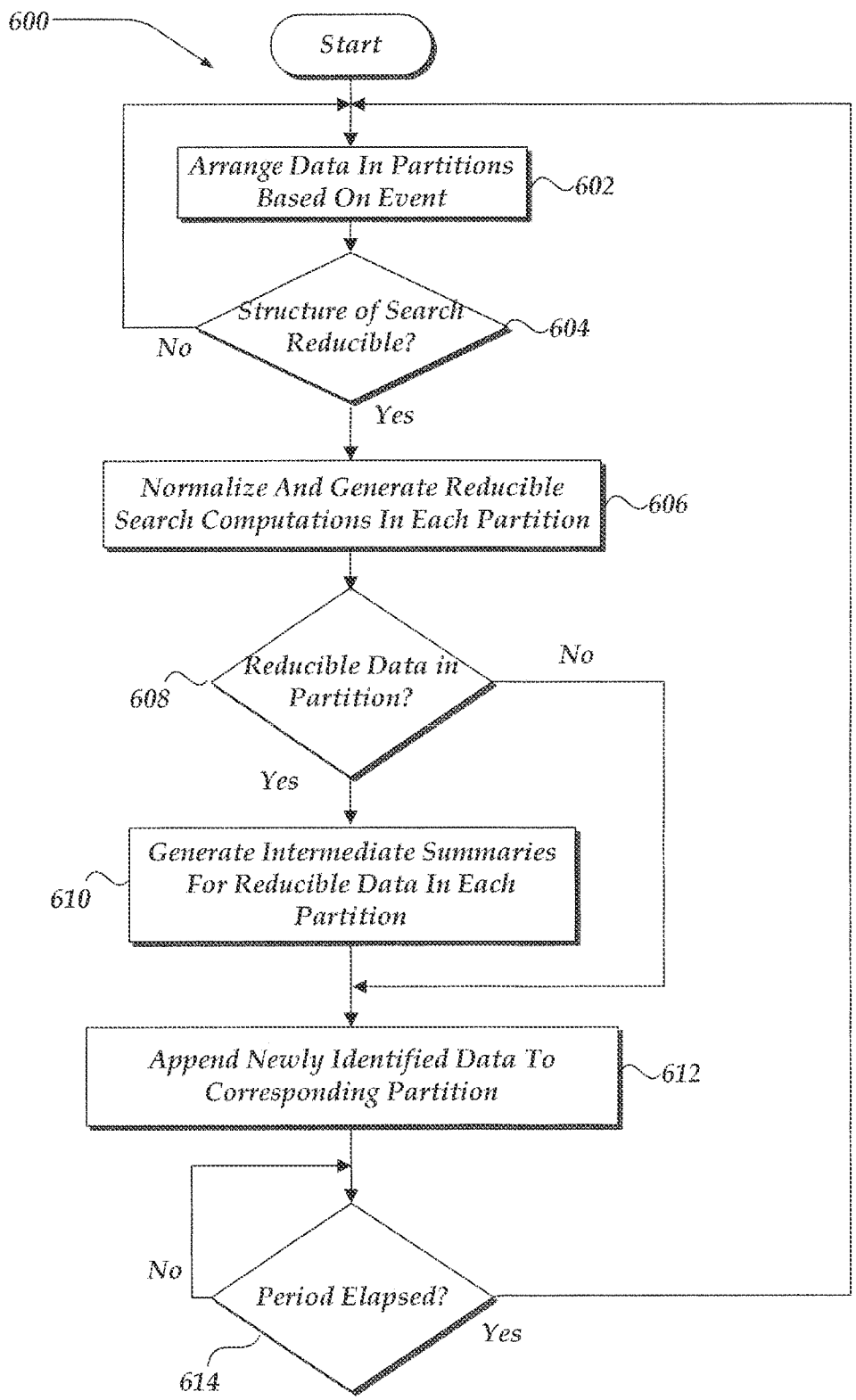
FIG. 6 illustrates a flowchart for processing intermediate summaries and reducible search computations for partitioned data.

FIG. 6 illustrates overview flowchart 600 for processing intermediate summaries and reducible search computations for a particular search report for data that is arranged in a plurality of partitions. Moving from a start block, the process advances to block 602 where the data set is arranged in a plurality of partitions that correspond to a time of occurrence for events. At decision block 604, a determination is made as to whether the structure of a particular requested search report is reducible. If negative, the logic loops back to block 602. However, if the determination at block 604 is affirmative, the process flows to block 606 where reducible search computations are performed on data in each partition for the particular search report. The values generated by the reducible search computations are normalized for the data set.

At decision block 608, a determination is made as to whether reducible data is present in a partition for a particular search report. If true, the process advances to block 610, where the process generates intermediate summaries for reducible data in each partition for the particular search report. In some cases, a very small portion of data in each partition may be reducible, and/or the reduction in the data may not be significant for a particular search report. Consequently, even though some intermediate summaries may be generated, the process may determine to not continue to do so if the advantage (reduction in data to be processed for a particular search report) is relatively small.

Moving to block 612, newly identified data for an event may be appended to other data already arranged in a partition that corresponds to the event. Also, if the determination at decision block 608 was false (no reducible data in at least one partition for a particular search report), the process would jump to block 612 and perform substantially the same actions as discussed above.

At decision block 614, if a period of time since the last processing of the partitioned data set has not yet elapsed, the process loops until true and then loops back to block 602 where it performs substantially the same actions as discussed above.

Figure 7:
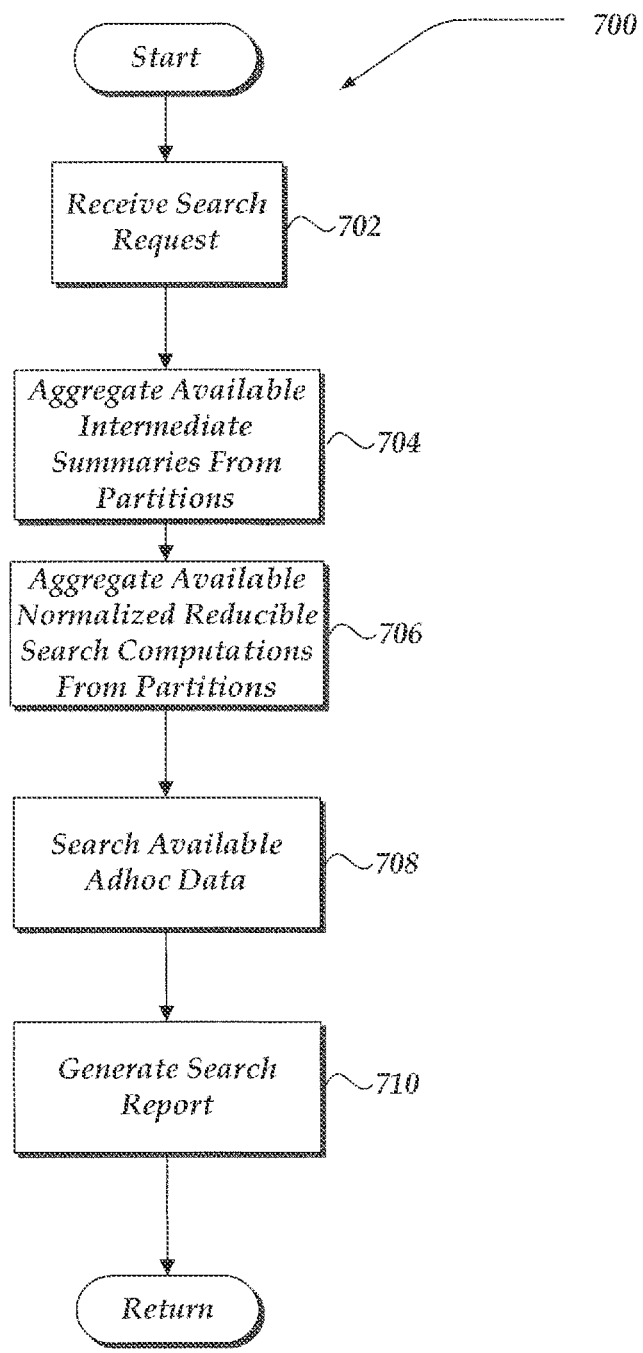
FIG. 7 shows a flowchart for processing a search request.

FIG. 7 shows a flowchart of a general overview 700 for processing a request for a particular search report. Moving from a start block, the process advances to block 702 where a query for a particular search report is received.

At block 704, the available intermediate summaries for the particular search report from one or more partitions are aggregated. Similarly, at block 706, the available normalized reducible search computations for the particular search report from one or more partitions are aggregated.

Moving to block 708, the search query for the particular search report is performed on adhoc data that is non-reducible. Advancing to block 710, a result for the particular search report is generated based at least in part on the aggregated intermediate summaries, aggregated reducible search computations, and the query performed on the adhoc data. Next, the process returns to performing other actions.

Figure 8:
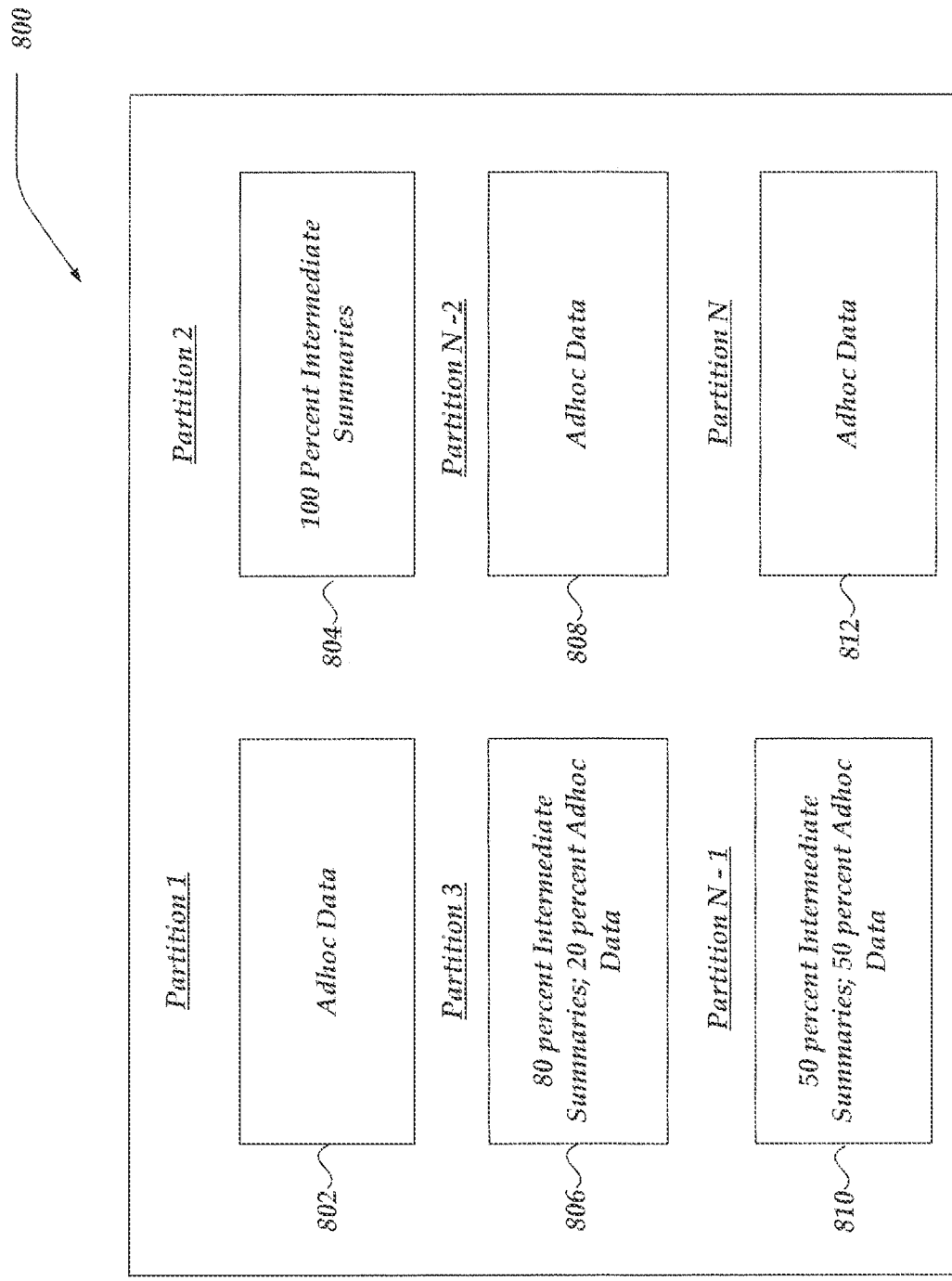
FIG. 8 illustrates a schematic diagram of a data set that includes a plurality of partitions.

FIG. 8 illustrates a schematic diagram of data set 800 that includes a plurality of data partitions 802, 804, 806, 808, 810, and 812 that correspond to events over time. As shown, partitions 802, 808 and 812 include non-reducible adhoc data for a particular search report. Partition 804 includes 100 percent intermediate summaries for the particular search report. Partitions 806 and 810 include partial intermediate summaries and partial adhoc data for the particular search report. Also, appended to partition 808 is newly identified data for the event that corresponds to the partition.

FIG. 9 shows an exemplary table of raw data that includes columns for time, name, size, and ip address on a server. Also, FIG. 10 illustrates an exemplary table of intermediate summaries that may be generated for a query that needs the average and maximum of the size field over time split by name. In addition to time and name, the table includes the count of the size field, the maximum of the size field, and the sum of the size field for each value of time and name. This may be because in at least one of the various embodiments a separate accounting of the count and the sum may be maintained to compute an accurate overall average (arithmetic mean).

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Furthermore, it will be understood that for at least one of the various embodiments, various types of data may be received and processed as described and claimed herein. And, at least one of the various embodiments is not limited to processing machine data.

What is claimed as new and desired to be protected by Letters Patent of the United States is:

1. A method, comprising:
   providing a datastore comprising a plurality of time-stamped events, each event having a portion of raw data and a timestamp extracted from the portion of raw data;
   receiving a query to produce a search result to be generated and appended with new event data corresponding to events received during periodic intervals;
   determining whether event data responsive to the query is reducible, wherein reducible event data is a result of a reducible search computation and operable to be reused in one or more different search results, and wherein the search result is appended with new reducible event data at the periodic intervals;
   responsive to a determination that the event data responsive to the query is reducible, generating one or more intermediate summaries of the event data responsive to the query; and
   generating the search result using the one or more intermediate summaries.

2. The method of claim 1, wherein the generating the one or more intermediate summaries comprises generating the one or more intermediate summaries of the event data responsive to the query for distinct time periods in a time range specified by the query for the search result, wherein at least one of the distinct time periods occurs during one of the periodic intervals.

3. The method of claim 1, wherein the generating the search result using the one or more intermediate summaries comprises:
   aggregating the one or more intermediate summaries; and
   generating the search result from data in the one or more intermediate summaries.

4. The method of claim 1, wherein the generating the search result using the one or more intermediate summaries further comprises:
   determining that additional event data relevant to the search result exists that was not summarized in the one or more intermediate summaries; and
   generating the search result using the one or more intermediate summaries and the additional event data.

5. The method of claim 1, wherein the generating the search result using the one or more intermediate summaries further comprises:
   determining that additional event data relevant to the search result exists that was not summarized in the one or more intermediate summaries; and
   generating the search result using the one or more intermediate summaries and the additional event data, wherein data contained in the one or more intermediate summaries is reusable for future search queries and wherein the additional event data is unique to the search result.

6. The method of claim 1, wherein the generating the search result using the one or more intermediate summaries further comprises:
   determining that additional event data relevant to the search result exists that was not summarized in the one or more intermediate summaries, wherein the additional event data comprises non-reducible data; and
   generating the search result using the one or more intermediate summaries and the additional event data.

7. The method of claim 1, further comprising:
   receiving a second query to generate a second search result;
   determining whether the one or more intermediate summaries can be reused to generate the second search result;
   responsive to a determination that the one or more intermediate summaries can be reused, aggregating the one or more intermediate summaries of the event data; and
   generating the second search result using the aggregated intermediate summaries.

8. The method of claim 1, wherein the one or more intermediate summaries are operable to be generated by an application that indexes the raw data into one or more partitions comprising time-stamped events from the plurality of time-stamped events.

9. The method of claim 1, wherein the data stored in the datastore is partitioned based on time occurrence of time-stamped events from the plurality of time-stamped events.

10. A non-transitory computer-readable storage medium storing computer-executable instructions which, when executed by a processor, cause the processor to perform operations comprising:
    providing a datastore comprising a plurality of time-stamped events, each event having a portion of raw data and a timestamp extracted from the portion of raw data;
    receiving a query to produce a search result to be generated and appended with new event data corresponding to events received during periodic intervals;
    determining whether event data responsive to the query is reducible, wherein reducible event data is a result of a reducible search computation and operable to be reused in one or more different search results, and wherein the search result is appended with new reducible event data at the periodic intervals;

responsive to a determination that the event data responsive to the query is reducible, generating one or more intermediate summaries of the event data responsive to the query; and generating the search result using the one or more intermediate summaries.

11. The non-transitory computer-readable storage medium of claim 10, wherein the generating the one or more intermediate summaries comprises generating the one or more intermediate summaries of the event data responsive to the query for distinct time periods in a time range specified by the query for the search result, wherein at least one of the distinct time periods occurs during one of the periodic intervals.

12. The non-transitory computer-readable storage medium of claim 10, wherein the generating the search result using the one or more intermediate summaries comprises:

aggregating the one or more intermediate summaries; and generating the search result from data in the one or more intermediate summaries.

13. The non-transitory computer-readable storage medium of claim 10, wherein the generating the search result using the one or more intermediate summaries further comprises:

determining that additional event data relevant to the search result exists that was not summarized in the one or more intermediate summaries; and generating the search result using the one or more intermediate summaries and the additional event data.

14. The non-transitory computer-readable storage medium of claim 10, wherein the generating the search result using the one or more intermediate summaries further comprises:

determining that additional event data relevant to the search result exists that was not summarized in the one or more intermediate summaries; and generating the search result using the one or more intermediate summaries and the additional event data, wherein data contained in the one or more intermediate summaries is reusable for future search queries and wherein the additional event data is unique to the search result.

15. The non-transitory computer-readable storage medium of claim 10, wherein generating the search result using the one or more intermediate summaries further comprises:

determining that additional event data relevant to the search result exists that was not summarized in the one or more intermediate summaries, wherein the additional event data comprises non-reducible data; and generating the search result using the one or more intermediate summaries and the additional event data.

16. The non-transitory computer-readable storage medium of claim 10, the operations further comprising:

receiving a second query to generate a second search result;

determining whether the one or more intermediate summaries can be reused to generate the second search result;

responsive to a determination that the one or more intermediate summaries can be reused, aggregating the one or more intermediate summaries of the event data; and generating the second search result using the aggregated intermediate summaries.

17. The non-transitory computer-readable storage medium of claim 10, wherein the one or more intermediate summaries are operable to be generated by an application that indexes the raw data into one or more partitions comprising time-stamped events from the plurality of time-stamped events.

18. The non-transitory computer-readable storage medium of claim 10, wherein the data stored in the datastore is partitioned based on time occurrence of time-stamped events from the plurality of time-stamped events.

19. A system comprising:

at least one memory storing computer-executable instructions; and at least one processor, wherein the at least one processor is configured to access the at least one memory and to execute the computer-executable instructions to:

provide a datastore comprising a plurality of time-stamped events, each event having a portion of raw data and a timestamp extracted from the portion of raw data;

receive a query to produce a search result to be generated and appended with new event data corresponding to events received during periodic intervals;

determine whether event data responsive to the query is reducible, wherein reducible event data is a result of a reducible search computation and operable to be reused in one or more different search results, and wherein the search result is appended with new reducible event data at the periodic intervals;

responsive to a determination that the event data responsive to the query is reducible, generate one or more intermediate summaries of the event data responsive to the query; and generate the search result using the one or more intermediate summaries.

20. The system of claim 19, wherein to generate the search result the at least one processor is configured to generate the one or more intermediate summaries of the event data responsive to the query for distinct time periods in a time range specified by the query for the search result, wherein at least one of the distinct time periods occurs during one of the periodic intervals.

21. The system of claim 19, wherein to generate the search result using the one or more intermediate summaries, the at least one processor is configured to:

aggregate the one or more intermediate summaries; and generate the search result from data in the one or more intermediate summaries.

22. The system of claim 19, wherein to generate the search result using the one or more intermediate summaries, the at least one processor is configured to:

determine that additional event data relevant to the search result exists that was not summarized in the one or more intermediate summaries; and generate the search result using the one or more intermediate summaries and the additional event data.

23. The system of claim 19, wherein to generate the search result using the one or more intermediate summaries, the at least one processor is configured to:

determine that additional event data relevant to the search result exists that was not summarized in the one or more intermediate summaries; and generate the search result using the one or more intermediate summaries and the additional event data, wherein data contained in the one or more intermediate summaries is reusable for future search queries and wherein the additional event data is unique to the search result.

24. The system of claim 19, wherein to generate the search result using the one or more intermediate summaries, the at least one processor is configured to:
  determine that additional event data relevant to the search result exists that was not summarized in the one or more intermediate summaries, wherein the additional event data comprises non-reducible data; and
  generate the search result using the one or more intermediate summaries and the additional event data.

25. The system of claim 19, wherein the at least one processor is further configured to:
  receive a second query to generate a second search result;
  determine whether the one or more intermediate summaries can be reused to generate the second search result;
  responsive to a determination that the one or more intermediate summaries can be reused, aggregate the one or more intermediate summaries of the event data; and
  generate the second search result using the aggregated intermediate summaries.

26. The system of claim 19, wherein the one or more intermediate summaries are operable to be generated by an application that indexes the raw data into one or more partitions comprising time-stamped events from the plurality of time-stamped events.

27. The system of claim 19, wherein the data stored in the datastore is partitioned based on time occurrence of time-stamped events from the plurality of time-stamped events.

* * * * *